United States Patent
Deng et al.

(10) Patent No.: US 9,836,554 B2
(45) Date of Patent: Dec. 5, 2017

(54) METHOD AND SYSTEM FOR PROVIDING QUERY SUGGESTIONS INCLUDING ENTITIES

(71) Applicant: Yahoo! Inc., Sunnyvale, CA (US)

(72) Inventors: Hongbo Deng, San Jose, CA (US); Anlei Dong, Fremont, CA (US); Shenhong Zhu, Santa Clara, CA (US); Jiuhe Gan, Cupertino, CA (US); Sudarshan Lamkhede, Santa Clara, CA (US); Yi Chang, Sunnyvale, CA (US)

(73) Assignee: EXCALIBUR IP, LLC, Sunnyvale, CA (US)

( * ) Notice: Subject to any disclaimer, the term of this patent is extended or adjusted under 35 U.S.C. 154(b) by 410 days.

(21) Appl. No.: 14/265,900

(22) Filed: Apr. 30, 2014

(65) Prior Publication Data

US 2015/0317317 A1 Nov. 5, 2015

(51) Int. Cl.
*G06F 7/02* (2006.01)
*G06F 17/30* (2006.01)

(52) U.S. Cl.
CPC ...... *G06F 17/3097* (2013.01); *G06F 17/3053* (2013.01); *G06F 17/3064* (2013.01); *G06F 17/30864* (2013.01)

(58) Field of Classification Search
None
See application file for complete search history.

(56) References Cited

U.S. PATENT DOCUMENTS

| | | | |
|---|---|---|---|
| 8,326,826 B1 * | 12/2012 | Upstill | G06F 17/30873 707/723 |
| 9,355,191 B1 * | 5/2016 | Finkelstein | G06F 17/3097 |
| 9,524,290 B2 * | 12/2016 | Pasquero | G06F 17/276 |
| 2005/0222976 A1 * | 10/2005 | Pfleger | G06F 17/30646 |
| 2006/0230035 A1 * | 10/2006 | Bailey | G06F 17/3064 |
| 2011/0184951 A1 * | 7/2011 | Paparizos | G06F 17/30864 707/737 |
| 2012/0124071 A1 * | 5/2012 | Gebhard | G06F 17/3097 707/767 |
| 2012/0330990 A1 * | 12/2012 | Chen | G06F 17/28 707/761 |
| 2014/0188894 A1 * | 7/2014 | Chechik | G06F 3/04883 707/748 |
| 2014/0201229 A1 * | 7/2014 | Kirazci | G06F 17/30643 707/767 |
| 2014/0337371 A1 * | 11/2014 | Li | G06F 17/30958 707/767 |
| 2014/0358940 A1 * | 12/2014 | Gupta | G06F 17/3053 707/748 |

(Continued)

*Primary Examiner* — Bruce Moser
(74) *Attorney, Agent, or Firm* — Pillsbury Winthrop Shaw Pittman LLP

(57) ABSTRACT

Methods, systems and programming for providing query suggestions including entities. In one example, a prefix of a query is first received. A plurality of query suggestions are then identified based on the prefix of the query. The plurality of query suggestions include at least one entity. Scores of each of the plurality of query suggestions are computed using a first model. The first model includes an adjustable parameter used for computing the score of the at least one entity. The plurality of question suggestions are ranked based, at least in part, on the scores.

19 Claims, 17 Drawing Sheets

(56) References Cited

U.S. PATENT DOCUMENTS

2015/0294029 A1* 10/2015 Sanghai ............ G06F 17/30973
707/732
2015/0310005 A1* 10/2015 Ryger ............... G06F 17/30011
707/706

* cited by examiner

METHOD AND SYSTEM FOR PROVIDING QUERY SUGGESTIONS INCLUDING ENTITIES

CROSS-REFERENCE TO RELATED APPLICATION

The present application is related to a U.S. patent application Ser. No. 14/265,780, filed Apr. 30, 2014, which is now U.S. Pat. No. 9,600,600 issued Mar. 21, 2017, entitled "METHOD AND SYSTEM FOR EVALUATING QUERY SUGGESTIONS QUALITY," which is incorporated herein by reference in its entirety.

BACKGROUND

1. Technical Field

The present teaching relates to methods, systems, and programming for Internet services. Particularly, the present teaching is directed to methods, systems, and programming for query suggestions.

2. Discussion of Technical Background

Online content search is a process of interactively searching for and retrieving requested information via a search application running on a local user device, such as a computer or a mobile device, from online databases. Online search is conducted through search engines, which are programs running at a remote server and searching documents for specified keywords and return a list of the documents where the keywords were found. Known major search engines have features called "search suggestion" or "query suggestion" designed to help users narrow in on what they are looking for. For example, as users type a search query, a list of query suggestions that have been used by many other users before are displayed to assist the users in selecting a desired search query.

However, query suggestions provided by existing search engines are limited to search terms (keywords) that are mined from query logs. Query suggestions are often ranked based on popularity of each mined search term in search history with respect to general user population. Moreover, there lacks an efficient and effective way to measure the precision of entity tagging and ranking in query suggestion. Traditionally, precision can only be measured using editorial judgments or other methods of gathering ground truth, which is both costly and often introduces extensive latencies. Also, editorial judgment or ground truth-based precision measurement methods are limited to a set of sample entities, rather than the entire reachable portion of the query suggestion system.

Therefore, there is a need to provide an improved solution for query suggestion to solve the above-mentioned problems.

SUMMARY

The present teaching relates to methods, systems, and programming for Internet services. Particularly, the present teaching is directed to methods, systems, and programming for query suggestions.

In one example, a method, implemented on at least one computing device each having at least one processor, storage, and a communication platform connected to a network for providing query suggestions including entities is presented. A prefix of a query is first received. A plurality of query suggestions are then identified based on the prefix of the query. The plurality of query suggestions include at least one entity. Scores of each of the plurality of query suggestions are computed using a first model. The first model includes an adjustable parameter used for computing the score of the at least one entity. The plurality of question suggestions are ranked based, at least in part, on the scores.

In another example, a method, implemented on at least one computing device each having at least one processor, storage, and a communication platform connected to a network for providing query suggestions including entities is presented. A prefix of a query is first received from a user. A plurality of query suggestions are then identified based on the prefix of the query. The plurality of query suggestions include at least one entity and at least one non-entity keyword. Scores of each of the plurality of query suggestions are computed using a first model. The first model includes an adjustable parameter used for computing the score of the at least one entity. The plurality of question suggestions are ranked based, at least in part, on the scores. The ranked plurality of question suggestions are provided to the user. The at least one entity and the at least one non-entity keyword are presented in different manners.

In a different example, a system having at least one processor, storage, and a communication platform for providing query suggestions including entities is presented. The system includes a retrieving module and a ranking module. The retrieving module is configured to receive a prefix of a query and identify a plurality of query suggestions based on the prefix of the query. The plurality of query suggestions include at least one entity. The ranking module is configured to compute scores of each of the plurality of query suggestions using a first model and rank the plurality of question suggestions based, at least in part, on the scores. The first model includes an adjustable parameter used for computing the score of the at least one entity.

Other concepts relate to software for providing query suggestions including entities. A software product, in accord with this concept, includes at least one non-transitory machine-readable medium and information carried by the medium. The information carried by the medium may be executable program code data regarding parameters in association with a request or operational parameters, such as information related to a user, a request, or a social group, etc.

In one example, a non-transitory machine readable medium having information recorded thereon for providing query suggestions including entities is presented. The recorded information, when read by the machine, causes the machine to perform a series of processes. A prefix of a query is first received. A plurality of query suggestions are then identified based on the prefix of the query. The plurality of query suggestions include at least one entity. Scores of each of the plurality of query suggestions are computed using a first model. The first model includes an adjustable parameter used for computing the score of the at least one entity. The plurality of question suggestions are ranked based, at least in part, on the scores.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of efficient and effective query suggestion. The method and system as disclosed herein aims at improving end-users' search experience by including not only traditional query suggestions (search terms or keywords) but also named entities. In addition, the method and system further ranks the "hybrid" query suggestions using a multi-faceted and personalized approach. The method and system thus provides search assist ranking results that are relevant to users while also ensure the flexible control of entity coverage for the purpose of providing the best search experience to users. There are following novel features of the method and system: (1) easy to control relevance and coverage from different entity sources; (2) simple and easy to debug because it is a linear function; (3) using divide and conquer strategy, and thus easy to plug in with new entity categories; and (4) effectively achieving relevance and personalization.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

Figure 1:
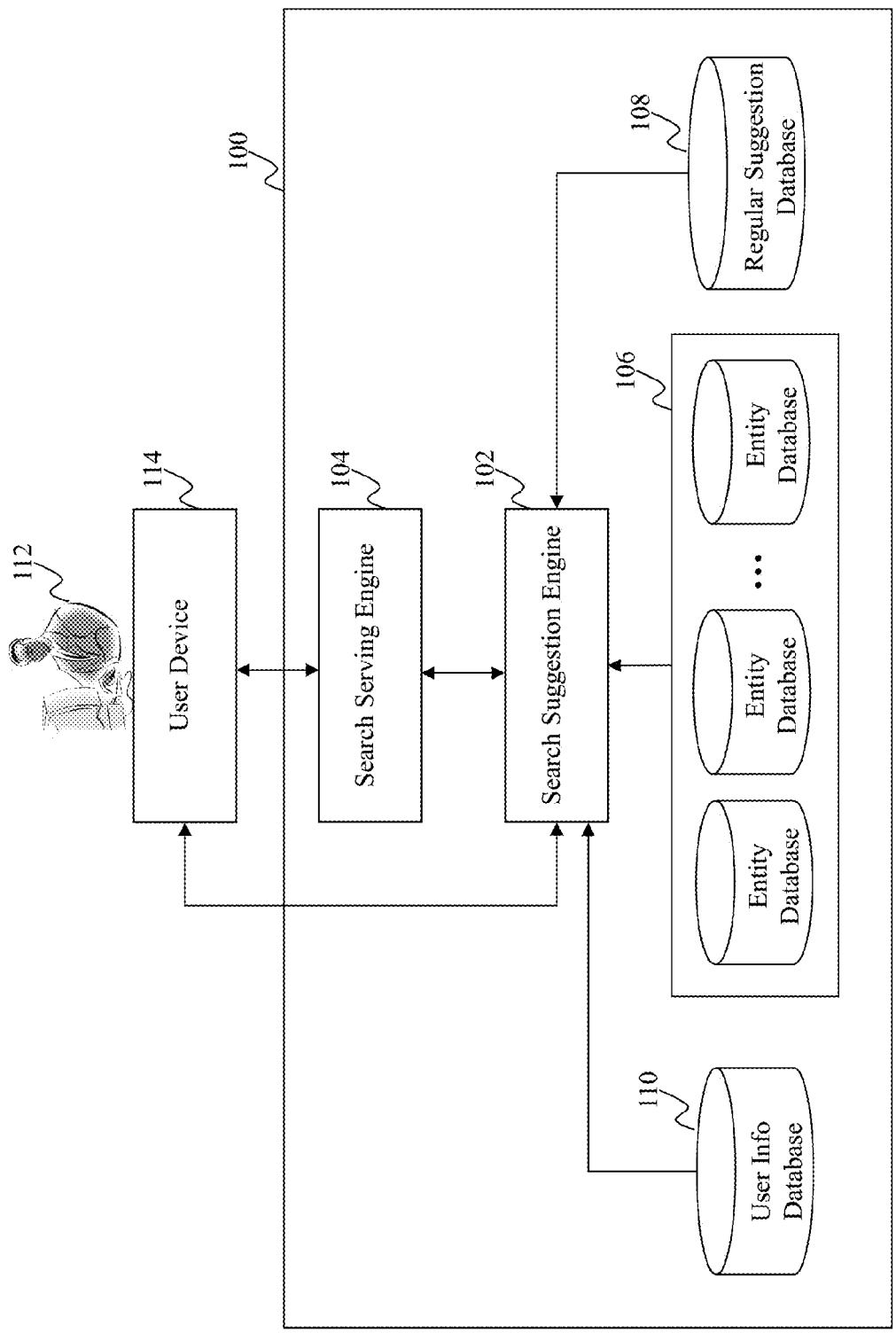
FIG. 1 is a high level exemplary system diagram of a system for providing query suggestions including entities, according to an embodiment of the present teaching.

FIG. 1 is a high level exemplary system diagram of a system for providing query suggestions including entities, according to an embodiment of the present teaching. In this embodiment, the system 100 is deployed on one or more servers and includes a search suggestion engine 102, a search serving engine 104, multiple entity database 106, regular suggestion database 108, and user information database 110. A user 112 in this embodiment performs an online search through a user device 114 and the backend search serving engine 104.

The user 112 instantly gets query suggestions provided by the backend search suggestion engine 102 in response to the user's partial query input (i.e., query prefix). The query suggestions provided by the search suggestion engine 102 include at least one entity that is from one of the entity database 106. The "entity" referred in the present disclosure includes named entity, which may be a phrase that identifies one item from a set of other items that have similar attributes, such as proper nouns or common names acting as proper nouns. Examples of named entities include, for example, names of persons, organizations, locations, etc. In this embodiment, non-entity keywords (i.e. regular query suggestions mined from query logs) may be provided to the user 112 as well. In other words, both entity suggestions and non-entity suggestions may be provided to the user 112 in a hybrid manner with the ranking of these suggestions determined by the search suggestion engine 102. It is understood that, in some embodiments, only entity suggestions that are retrieved from one or more entity database 106 are provided to the user 112.

The user device 114 may be a laptop computer, desktop computer, netbook computer, media center, mobile device (e.g., a smart phone, tablet, music player, and global positioning system (GPS) receiver), gaming console, set-top box, printer, or any other suitable device. A search application, such as a web browser or a standalone search application, may be pre-installed on the user device 114 by the vendor of the user device 114 or installed by the user 112. The search application may serve as an interface between the user 112 and the remote search serving engine 104 and search suggestion engine 102. The search application may be stored in storage of the user device 114 and loaded into a memory once it is launched by the user 112. Once the search application is executed by one or more processors of the user device 114, the user device 114 sends a query or a partial query (also known as a prefix of a query, e.g., the first one or more characters of a query or first one or more words of a query with multiple words) entered by the user 112 to the remote search serving engine 104 and search suggestion engine 102. The user device 114 then receives search suggestions including entities in an order generated by the search suggestion engine 102. The user device 114 also receives query results, e.g., a list of hyperlinks, from the search serving engine 104 once the user 112 selects one of the query suggestions.

The search serving engine 104 in this example may be any suitable search engine. The search serving engine 104 is responsible for analyzing the received query from the user device 114, fetching query results, and returning the query results to the user device 114. Search queries, including the prefix of a search query, are continuously fed into the search suggestion engine 102 by the search serving engine 104 for generating and updating search query suggestions. By matching the query prefix, the search suggestions engine 102 obtains query suggestions from various data sources, including the entity database 106 and regular suggestion database 108. The obtained query suggestion candidates are then further refined and ranked by the search suggestion engine 102 using a multi-faceted ranking model based on various factors, such as popularity, relevance, diversity, distance, freshness, trends, etc. For example, the selection and ranking of the query suggestions in this embodiment may be personalized for the user 112 based on the user's information stored in the user information database 110.

Query suggestions in the regular suggestion database 108 are non-entity keywords or search terms mined from query logs with respect to the general user population. Each of the entity database 106 stores entities in a particular category (e.g., a domain of knowledge), such as but not limited to, news, local, shopping, maps, books, flights, movies, actors, TV shows, athletes, restaurants, lottery, products, etc. The entities in each entity database 106 may be manually selected by for example, editorial judgment or by any suitable data mining approaches as known in the art.

Figure 2:
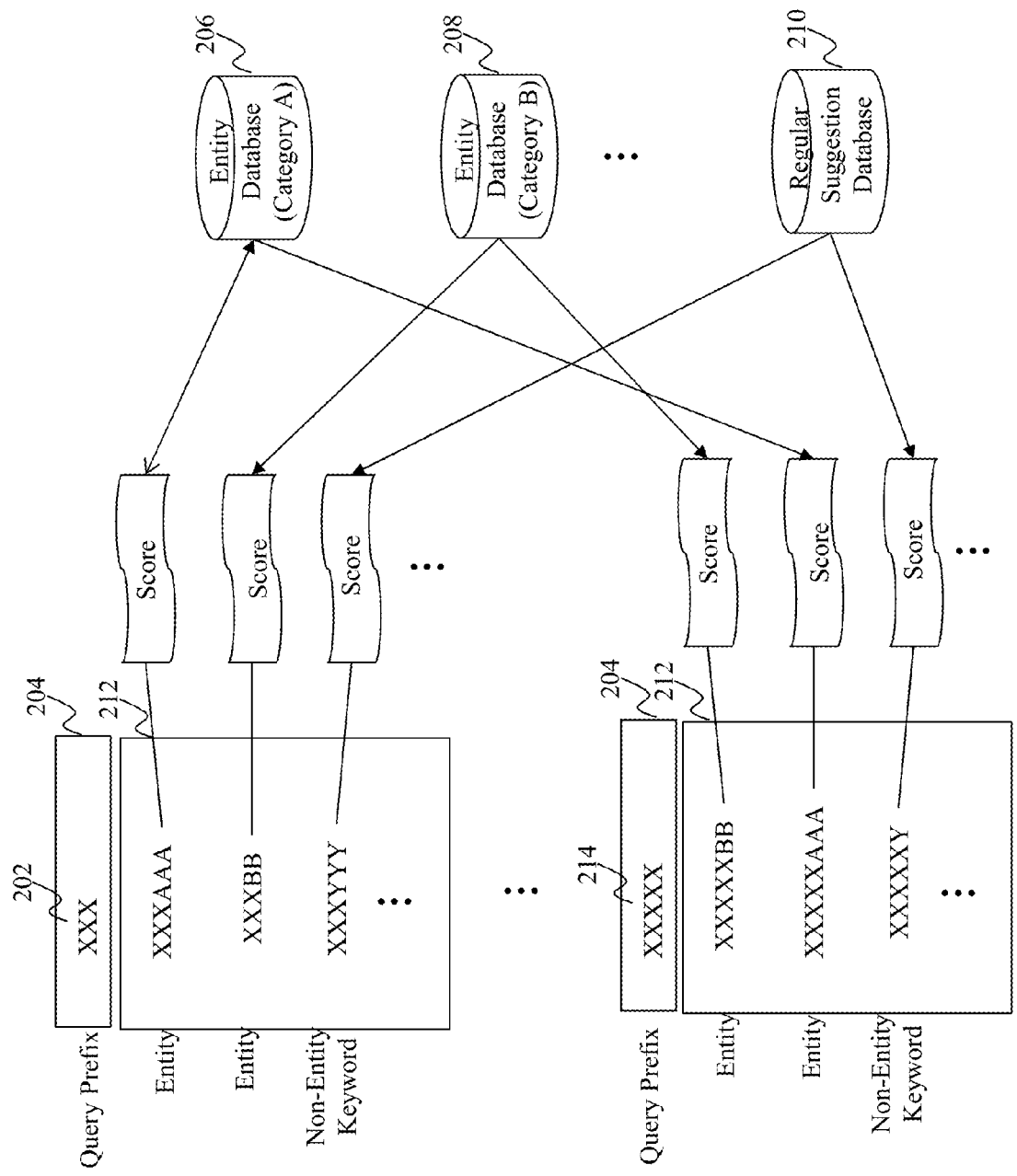
FIG. 2 depicts exemplary query suggestions including entities.

FIG. 2 depicts exemplary query suggestions including entities. In this example, a user inputs a query prefix 202 with three characters "XXX" in the search box 204 of a search application. At least three query suggestions that match with the query prefix—"XXXAAA," "XXXBB," and "XXXYYY" are retrieved as query suggestion candidates from different data sources, e.g., entity database (category A) 206, entity database (category B) 208, and regular suggestion database 210, respectively. Ranking scores for each of the query suggestion candidates are calculated by the search suggestion engine 102 using a multi-faceted ranking model based on various factors. The query suggestion candidates are ranked according to their scores and presented in a query suggestion box 212 under the search box 204 for the user to select. In this example, the top two query suggestions are entity suggestions, and the non-entity keyword "XXXYYY" is ranked below the entity suggestion. As described below in details, an adjustable parameter (weight parameter) may be included in the ranking model for computing scores for each entity suggestion. In some embodiments, in order to emphasis the entity suggestions, weight parameters may be adjusted in the ranking model such that entity suggestions are more likely to have a higher ranking score than non-entity suggestions and are thus ranked on top of the query suggestion list.

Figure 13:
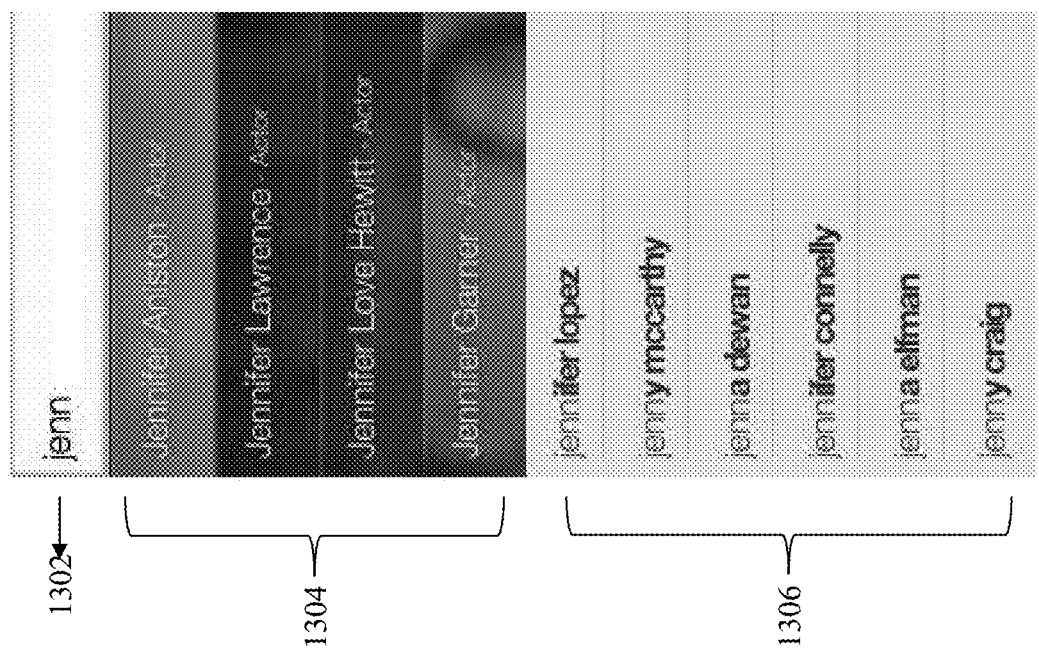
FIG. 13 depicts an exemplary screen shot showing query suggestions including entities.

FIG. 13 depicts an exemplary screen shot showing query suggestions including entities. In this example, a partial query/query prefix "jenn" 1302 is inputted in the search box. In response, 10 query suggestions are returned in an order. The top four query suggestions 1304 are all entity suggestions retrieved from entity database (actor entity database in this example). The rest query suggestions 1306 are non-entity keywords retrieved from regular query suggestion database. It is understood that although some of the keywords 1306 also happen to be names of persons, they are not considered as entity suggestions in this example because they are not obtained from a data source with a specific category or knowledge domain, but rather, are popular search terms mined from query logs of general user population. In this example, entity suggestions 1304 and non-entity suggestions 1306 are presented in different manners such that a user can easily distinguish them. Also, each of the entity suggestions 1304 is presented with a label indicating a category in which the entity suggestion belongs to ("Actor" in this example). No labels are presented with the non-entity suggestions 1306 as they are not retrieved from a data source with a specify category.

Referring back to FIG. 2, as the user continues to input more characters in the search box 204 (i.e., changing the query prefix), a new query prefix 214 "XXXXX" causes the update of the query suggestion list in the query suggestion box 212. New query suggestion candidates "XXXXXBB," "XXXXXAAA," and "XXXXXY" are determined by matching with the new query prefix 214 "XXXXX." The ranking scores are then calculated for each of the new query suggestion candidates and used for their ranking. The ranked new query suggestion candidates are presented to the user in response to the new query prefix 214 "XXXXX." As described below in details, the weight parameters for calculating the ranking scores for each entity suggestion may be also adjusted based on the length of the query prefix and/or the category of each entity suggestion.

Figure 3:
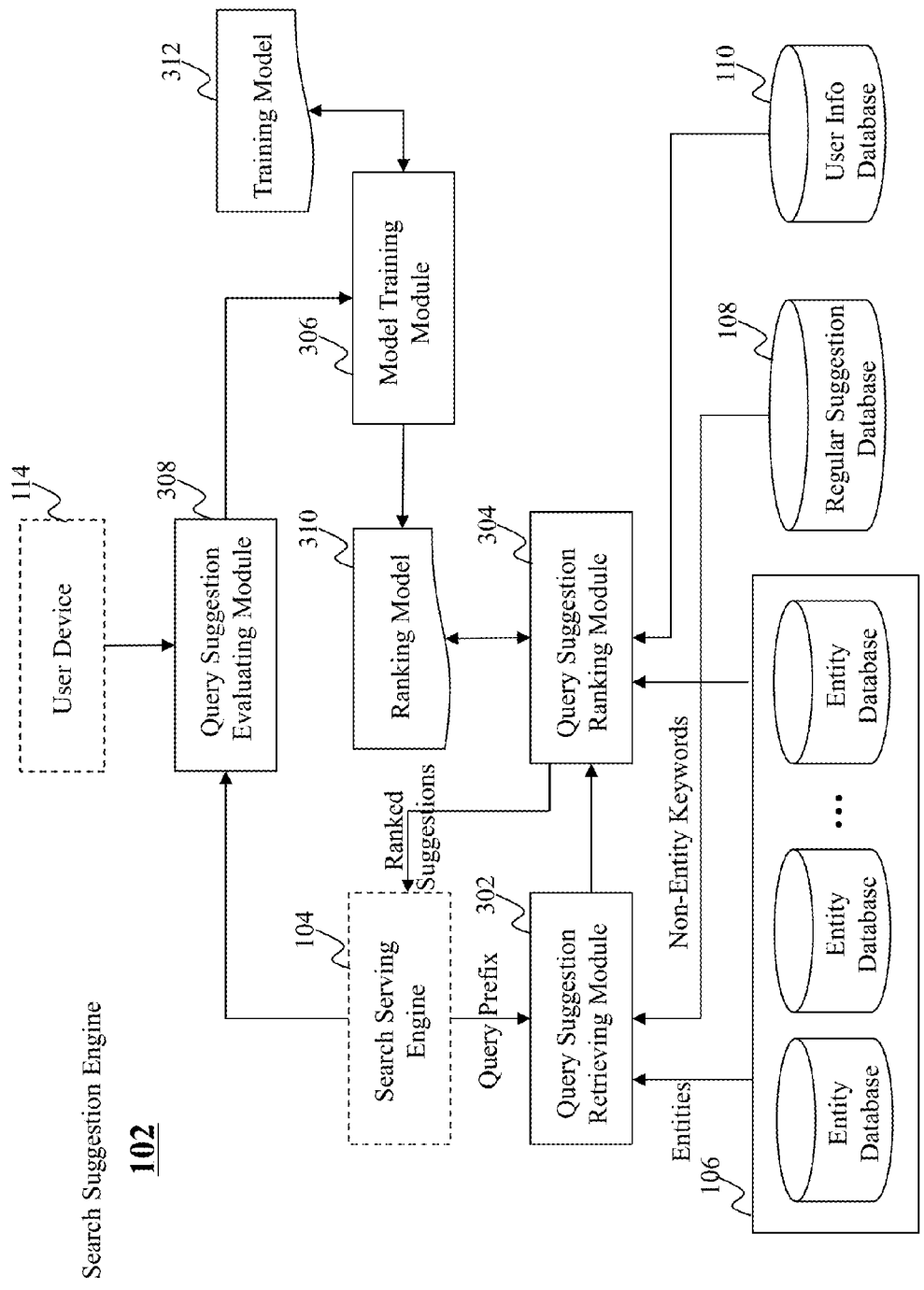
FIG. 3 is an exemplary diagram of a search suggestion engine of the system shown in FIG. 1, according to an embodiment of the present teaching.

FIG. 3 is an exemplary diagram of a search suggestion engine of the system shown in FIG. 1, according to an embodiment of the present teaching. In this example, the search suggestion engine 102 includes a query suggestion retrieving module 302, a query suggestion ranking module 304, a model training module 306, and a query suggestion evaluating module 308. The query suggestion retrieving module 302 receives the query prefix from either the search serving engine 104 or from the user 112 directly and then retrieves a plurality of query suggestions that match with the query prefix from different data sources, including entity database 106 of different categories and regular suggestion database 108. In this example, both entities and non-entity keywords are retrieved from entity database 106 and regular suggestion database 108 as query suggestion candidates. The query suggestion ranking module 304 is configured to rank the query suggestion candidates using a ranking model 310. Specifically, the query suggestion ranking module 304 calculates ranking scores for each of the query suggestion candidates using the ranking model 310. The ranking model 310 takes various factors into consideration in calculating the ranking scores, including popularity of each entity suggestion and their relevance with respect to the user's interests and preferences. For example, popularity of each entity suggestion may be obtained from the corresponding entity database 106 based on information related to each entity, such as the freshness or trend of each entity. As to the relevance, user profiles of the user who inputs the query prefix may be obtained from the user information database 110, and entity profile of each corresponding entity suggestion may be obtained from the entity database 106. Relevance may then be determined based on the matching between the user profile and entity profiles. The ranking model 310 may further include weight parameters for adjusting the ranking scores of the entity suggestions. The weight parameters may be adjusted according to different categories of the entities, the lengths of the query prefix, or any other factors. The weight parameters in this example can be trained by the model training module 306 using a training model 312 based on training data obtained by the query suggestion evaluating model 308.

The query suggestion evaluating module 308 in this example performs offline evaluation to determine the quality of query suggestions made by the ranking model 310 by monitoring user activities with respect to the query suggestions (e.g., click and skip behaviors). The quality metrics collected from different users are then used by the model training module 306 as training data to train the ranking model 310. In one example, the training model 312 used by the model training module 306 may be a 2D click/skip model in accordance with the user's click and skip behavior data evaluated by the query suggestion evaluating module 308. Two factors may be included in the 2D click/skip model: position bias and query prefix length. For example, users usually ignore query suggestions when they just start to type in a query. Therefore, query suggestions that are provided in response to query prefix with small lengths (e.g., one or two characters) shall be given less weight when their quality metrics are used as training data by the model training module 306. As to position bias, in general, position bias on mobile search is smaller than on desktop search. Thus, user click signals on mobile search are more informative than on desktop search and shall be given more weight.

Figure 4:
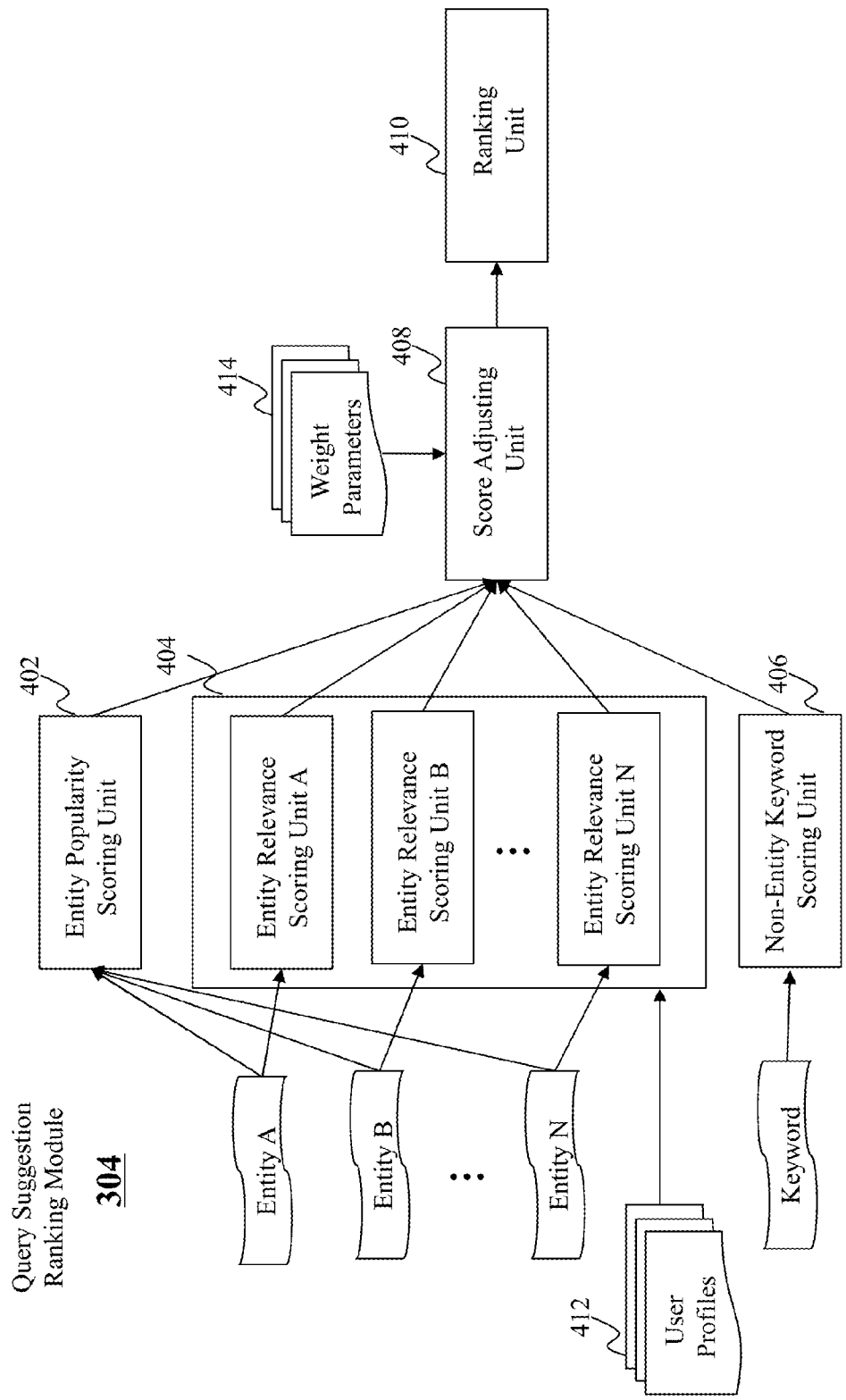
FIG. 4 is an exemplary diagram of a query suggestion ranking module of the search suggestion engine shown in FIG. 3, according to an embodiment of the present teaching.

FIG. 4 is an exemplary diagram of a query suggestion ranking module of the search suggestion engine shown in FIG. 3, according to an embodiment of the present teaching. The query suggestion ranking module 304 in this example includes an entity popularity scoring unit 402, entity relevance scoring units 404, a non-entity keyword scoring unit 406, a score adjusting unit 408, and a ranking unit 410. The entity popularity scoring unit 402 is responsible for computing entity popularity score p. For each entity category, a specific way of computing the entity popularity score p may be applied. For example, for entities in the movie category, their popularity computation can incorporate factors including movie release date and its buzzy signal. For entities in restaurant category, their popularity computation may rely more on the number of reviews for each restaurant and the rating thereof. As to entity relevance scoring units 404, in this example, the product of the user profile 412 u and each entity profile x represents the matching between user and entities: the higher the product value is, the more likely the user is interested in the entity personally. As shown in FIG. 4, the profile 412 of the user from which the query prefix is received is provided to the entity relevance scoring units 404. For each entity suggestion candidate, their corresponding entity profiles are fed into respective entity relevance scoring unit 404. The relevance score for each entity is then calculated by the respective entity relevance scoring unit 404 using the formula of $u*x$. It is understood that the profiles of entities in different categories may vary. For example, entity profiles in the movie category may include the type of the movie, e.g., comedy, drama, horror, romance, etc.; for flight entities, their entity profiles may include start and destination locations as users related to these two locations are more likely interested in this flight. The initial ranking score s in this example may incorporate both entity popularity score p and entity relevance score $u*x$: $s=p+u*x$.

As described above, the initial scores s are entity category dependent because the popularity and/or relevance calculation approaches may be different among between categories. Thus, the initial scores may not be used to make their rankings directly. The score adjusting unit 408 is responsible for adjusting the initial scores s for each entity suggestion candidate to obtain a final ranking score s_final for ranking: $s\_final = w*s$. Weight parameters w 414 are applied by the score adjusting unit 408. The weight parameters 414 may be adjusted for each entity category to normalize the final ranking scores s_final. In addition, as mentioned before, user's search intentions may vary as the query prefix length changes. When the query prefix is short, the search space of eligible entity suggestion candidates is big and the user usual ignores the query suggestions as she/he just starts inputting the query. With the query prefix becomes longer, the search intention of the user becomes clearer and the search space is smaller. Thus, the weight parameters 414 may be also optimized for different query prefix lengths.

In addition to entity suggestions, initial ranking scores of non-entity query suggestions may be calculated by the non-entity keyword scoring unit 406. The calculation may be made by any known approaches based on for example the frequency and/or recency in which a non-entity keyword appears in the query logs. In some embodiments, weight parameters w 414 may also be applied to calculate the final ranking scores of the non-entity keywords based on their initial ranking scores in order to be compared with the entity suggestion candidates. In order to emphasis the entity suggestions, in this example, weight parameters of the entity and/or non-entity suggestion candidates may be adjusted to give higher weight on the entity suggestion candidates. As described above with respect to FIG. 3, the weight parameters w 414 in this example may be manually set at initial values based on past experience or knowledge and are then tuned by the model training model 306 based on training data provide by query suggestion evaluating module 308. Adjusted final ranking scores s_final of each suggestion candidates are used for ranking by the ranking unit 410.

Figure 5:
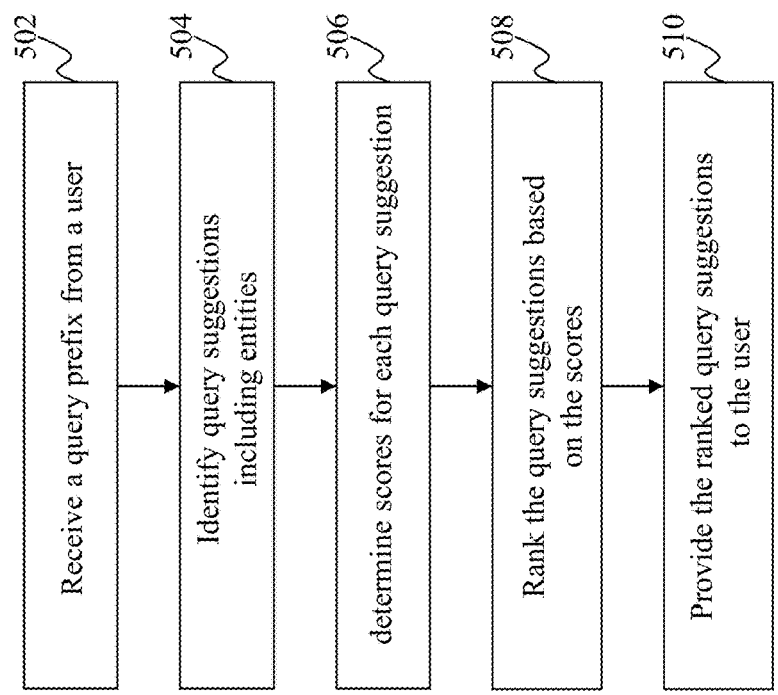
FIG. 5 is a flowchart of an exemplary process for providing query suggestions including entities, according to an embodiment of the present teaching.

FIG. 5 is a flowchart of an exemplary process for providing query suggestions including entities, according to an embodiment of the present teaching. Beginning at 502, a query prefix/partial query is received from a user when the user types in a query in a search box of a search application. At 504, a plurality of query suggestions including entity suggestions are identified by matching with the query prefix. Ranking scores for each of the query suggestions are determined at 506. For example, for entity suggestions, the ranking scores may be calculated by incorporating the popularity of each entity suggestion and/or relevance between the user's interests/preferences and each entity profile. For entities from different categories, their ranking scores may be normalized by weight parameters, which may be tuned for different query prefix lengths. The weight parameters may also be set such that the entity suggestions are more likely ranked higher than the non-entity suggestions. At 508, the query suggestions are ranked based on their ranking scores. Eventually at 510, the query suggestions are provided to the user in the ranked order for the user to select.

Figure 6:
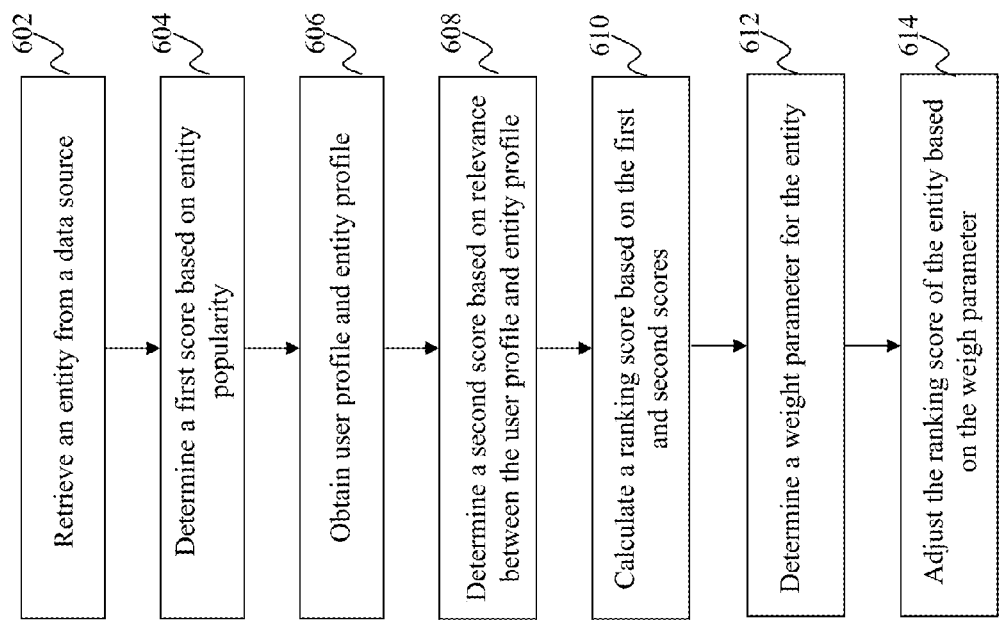
FIG. 6 is a flowchart of another exemplary process for providing query suggestions including entities, according to an embodiment of the present teaching.

FIG. 6 is a flowchart of another exemplary process for providing query suggestions including entities, according to an embodiment of the present teaching. This process is an example of calculating the final ranking scores for an entity suggestion. Beginning at 602, an entity suggestion is retrieved from an entity database. At 604, a popularity score is determined for the entity suggestion. Depending on the category of the entity database, different factors may be taken into account in calculating the popularity score. For example, for entities in the movie category, their popularity computation can incorporate the factors including movie release date and its buzzy signal. For entities in the restaurant category, their popularity computation may rely more on the number of reviews of each restaurant and the rating thereof. At 606, user profile and entity profile are obtained. The user and entity profiles are used for calculating the relevance score at 608. In one example, the product of the user and entity profiles is used to calculate the relevance score. At 610, an initial ranking score is calculated based on the popularity score and relevance score, for example, by combing the two scores together. It is understood that different weights may be given to the popularity and relevance scores as desired in different embodiments. At 612, a weight parameter is determined for the entity suggestion. The weight parameter may be determined by taking into consideration of the category, the length of query prefix, or any other factors. Eventually at 614, the initial ranking score of the entity suggestion is adjusted by the weight parameter to obtain a final ranking score.

Figure 7:
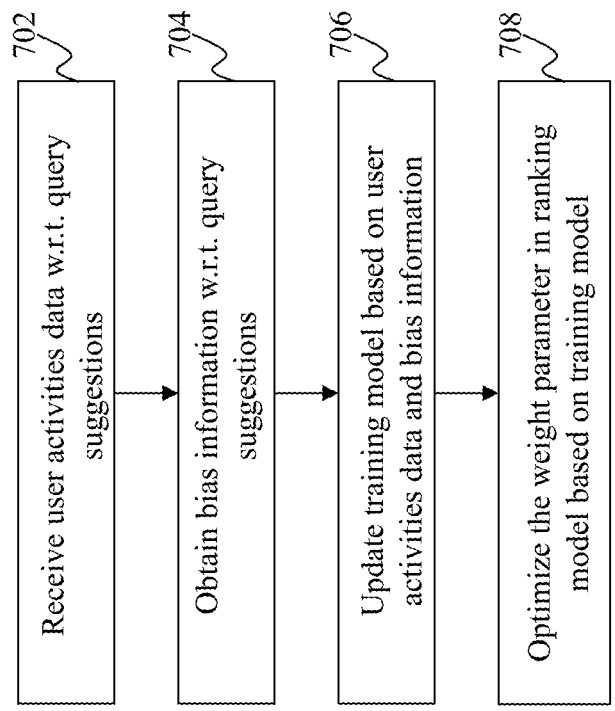
FIG. 7 is a flowchart of still another exemplary process for providing query suggestions including entities, according to an embodiment of the present teaching.

FIG. 7 is a flowchart of still another exemplary process for providing query suggestions including entities, according to an embodiment of the present teaching. This process is an example of optimizing the weight parameters in the ranking model. Beginning at 702, user activities with respect to query suggestions are received. The user activities include, for example, user click and skip behaviors in response to the query suggestions. At 704, bias information, such as positions of each query suggestion in the ranking, the query prefix lengths, or the presentation styles of each query suggestion, is obtained. A training model, e.g., a 2D click/skip model, is updated based on the user activities data and the bias information at 706. Eventually at 708, the weight parameters in the ranking model are optimized based on the training model.

Figure 8:
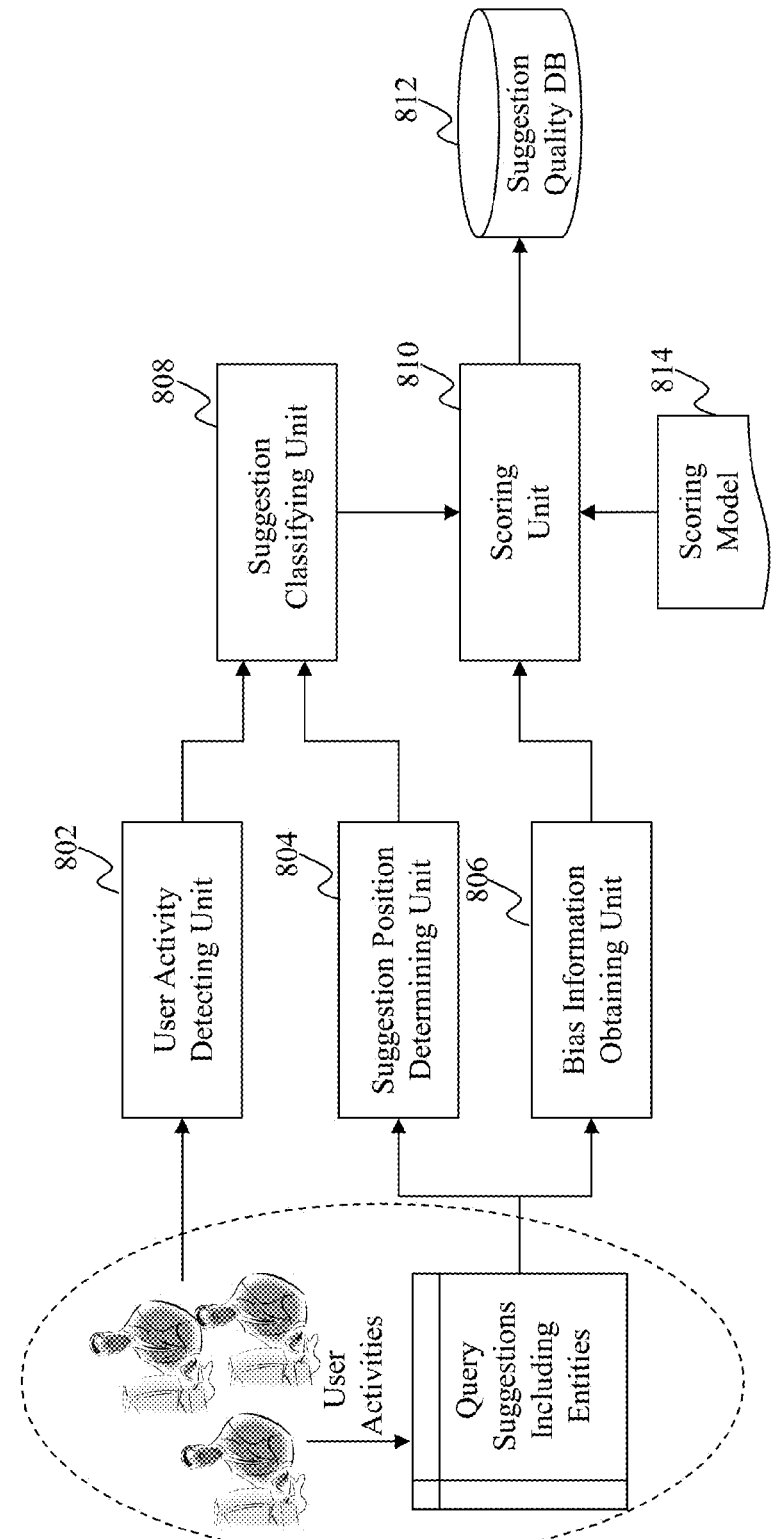
FIG. 8 is an exemplary diagram of a query suggestion evaluating module of the search suggestion engine shown in FIG. 3, according to an embodiment of the present teaching.

FIG. 8 is an exemplary diagram of a query suggestion evaluating module of the search suggestion engine shown in FIG. 3, according to an embodiment of the present teaching. The query suggestion evaluating module 308 can measure the quality, e.g., precision, of query suggestions provided and ranked by the search suggestion engine 102 without the costly process of gathering ground truth data, e.g., by editorial judgment. The query suggestion evaluating module 308 in this example uses actions taken by end users as a means to estimate precision, and are thus able to estimate precision in real time for the entire system with no additional cost to the users. Although in this embodiment, the query suggestion evaluating module 308 is shown as part of the search suggestion engine 102, it is understood that in some embodiments, the query suggestion evaluating module 308 may be a standalone system for evaluating query suggestion quality.

In this embodiment, the query suggestion evaluating module 308 includes a user activity detecting unit 802, a suggestion position determining unit 804, a bias information obtaining unit 806, a suggestion classifying unit 808, a scoring unit 810, and a suggestion quality database 812. As shown in FIG. 8, a set of query suggestions including entity suggestions are presented to a user in response to a query prefix inputted by the user. The set of query suggestions are presented in a ranking. User activities with respect to the set of ranked query suggestions are detected by the user activity detecting unit 802. The user activities include for example selecting one or more of the query suggestions and skipping one or more of the query suggestions. The user may select one or more query suggestions by mouse clicking, finger clicking on touch screen of a mobile device, hovering over, voice command, body gestures, or any other suitable user activities as known in the art. As to the skip actions, it may be any explicit actions that indicate non-selection of a query suggestion or may be implied by a selection action. For example, query suggestions that are passed over by the users in favor of a lower-ranked query suggestion are considered as being "skipped" by the user.

All the query suggestions are presented to the user in a ranking, and each of the query suggestions is associated with a position in the ranking. The suggestion position determining unit 804 is responsible for identifying the position of each query suggestion once a user activity is detected with respect to the set of query suggestions. In this example, the suggestion classifying unit 808, based on the user activities with respect to the query suggestions and the corresponding positions of the query suggestions, can classify the query suggestions into different groups. For example, if a user selects a suggestion C ranked at position 3, then the selected suggestion C may be given a positive label and classified into the "correct suggestions" group. The higher-ranked suggestions A and B at positions 1 and 2 are thus deemed as being skipped. The skipped suggestions A and B may be each given a negative label and classified into the "incorrect suggestions" group. If there is another lower-ranked suggestion D at position 4, as it has not been considered by the user (it is assumed that the user did not even look at any position below 3 if she or he selects the suggestion C at position 3 as the correct suggestion), it may be given as a neutral label and classified into the "unconsidered suggestions" group. In some embodiments, the user may not select any of the query suggestions because none of them satisfies her or his search intent. In those embodiments, all query suggestions are skipped and classified into the "incorrect suggestions" group. In still some embodiments, the user may select the top query suggestion. In those embodiments, the top query suggestion is classified into the "correct suggestions" group and all the rest are classified into the "unconsidered suggestions" group as there is no skipped query suggestion.

Additionally or optionally, bias information may be taken into account in evaluating the query suggestion quality. For example, the different presentation styles of the query suggestions, categories in which each entity suggestion belongs to, or the current query prefix length may have an impact on the user's selection or skipping of certain query suggestions. The bias information obtaining unit 806 may be configured to collect such information and provide it to the scoring unit 810 if needed. The scoring unit 810 is configured to calculate a quality measure of the presented query suggestions based on the classified query suggestions using a scoring model 814. In some embodiments, the bias information may also be considered in the calculation. The same query suggestions in response to a query prefix may be presented to a group of users, and the quality measure of the presented query suggestions are thus determined over users in the group. In one example, the scoring model 814 may be a mean reciprocal rank (MRR), which is a known statistic measure for evaluating a process that produces a list of possible responses to a sample of queries, ordered by probability of the correctness. In another example, the total or average number of "skipped" query suggestions over users in a group may be used as the quality measure. The calculated quality measures for different sets of query suggestions are stored in the suggestion quality database 812. As described above, the information stored in the suggestion quality database 812 may be used as training data to train the ranking model 310 of the search suggestion engine 102.

Figure 9:
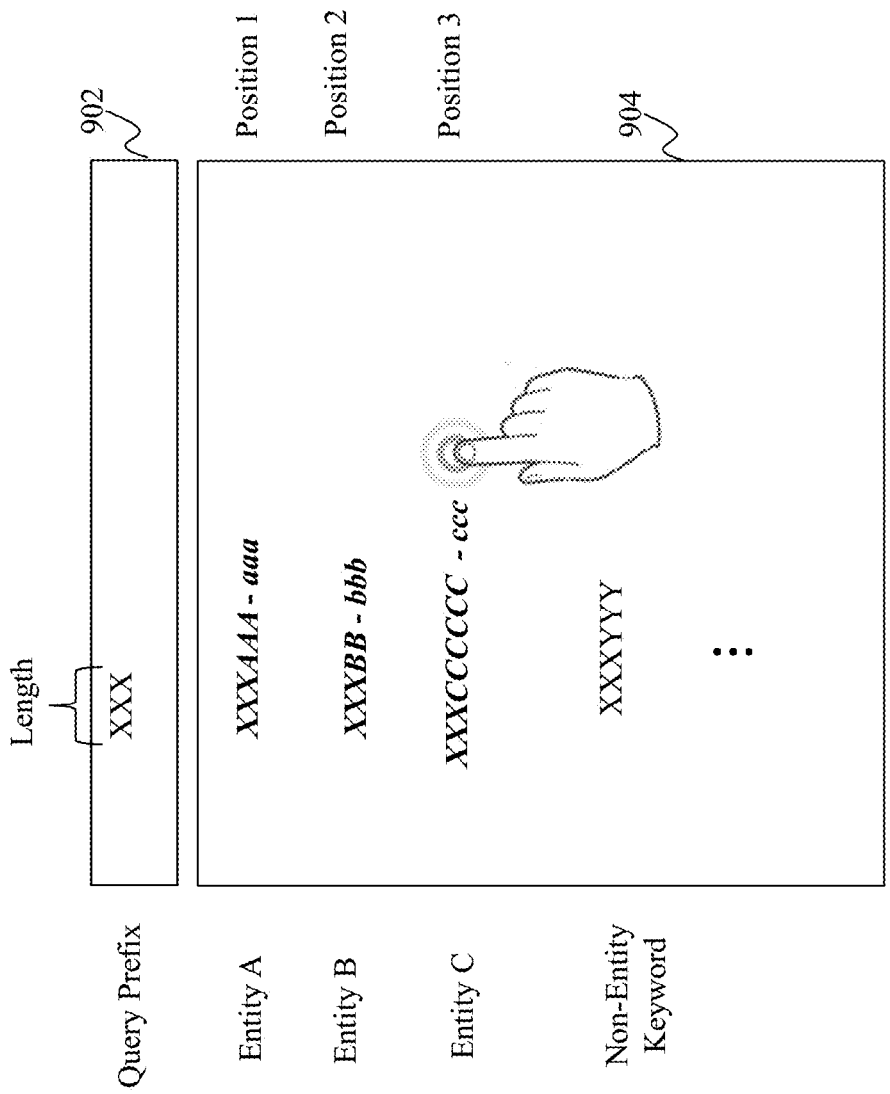
FIG. 9 depicts exemplary user activities with respect to query suggestions including entities.

FIG. 9 depicts exemplary user activities with respect to query suggestions including entities. In this example, a query prefix "XXX" is inputted by a user in the search box 902 of a search application. The search suggestion engine 102 returns a set of ranked query suggestions in the query suggestion box 904. The top three suggestions A, B, and C are all entity suggestions, while the rest suggestions are non-entity keywords. In this example, the user selects entity C "XXXCCCCC" by finger clicking it on a touch screen. The higher-ranked entity suggestions A and B are thus skipped and the lower-ranked non-entity keyword suggestions are unconsidered. The positions of each selected or skipped suggestions are also recorded for quality measure. Additional or optionally, bias information may be collected. For example, the current query prefix length, the category of each entity suggestions (e.g., -aaa, -bbb, -ccc), and/or the presentation styles (e.g., entities A, B, and C are boldface and italic) may be taken into account in calculating the quality measure of the query suggestions.

Figure 10:
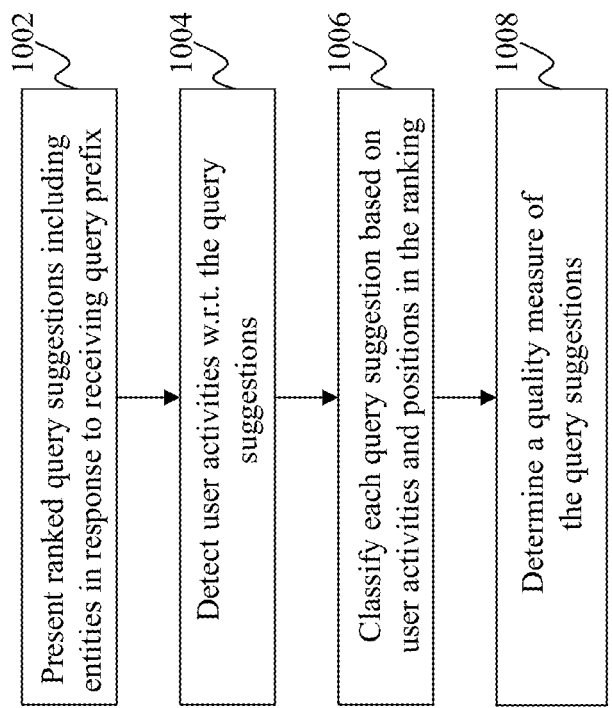
FIG. 10 is a flowchart of an exemplary process for evaluating query suggestions precision, according to an embodiment of the present teaching.

FIG. 10 is a flowchart of an exemplary process for evaluating query suggestions precision, according to an embodiment of the present teaching. Beginning at 1002, a plurality of query suggestions are presented to a user in response receiving a query prefix from the user. The query suggestions are ranked and include one or more entities. At 1004, user activities with respect to at least one of the query suggestions are detected. The user activities include, for example, selecting or skipping one or more query suggestions. Each of the query suggestions is then classified into different groups based on the user activities and positions of the respective query suggestion in the ranking at 1006. The groups include, for example, "correct suggestions," "incorrect suggestions," and "unconsidered suggestions." At 1008, a quality measure of the query suggestions is determined based on at least some of the classified query suggestions. The quality measure may be calculated based on MRR, or the total or average number of skipped query suggestions by a group of users who have been are presented with the same set of query suggestions.

Figure 11:
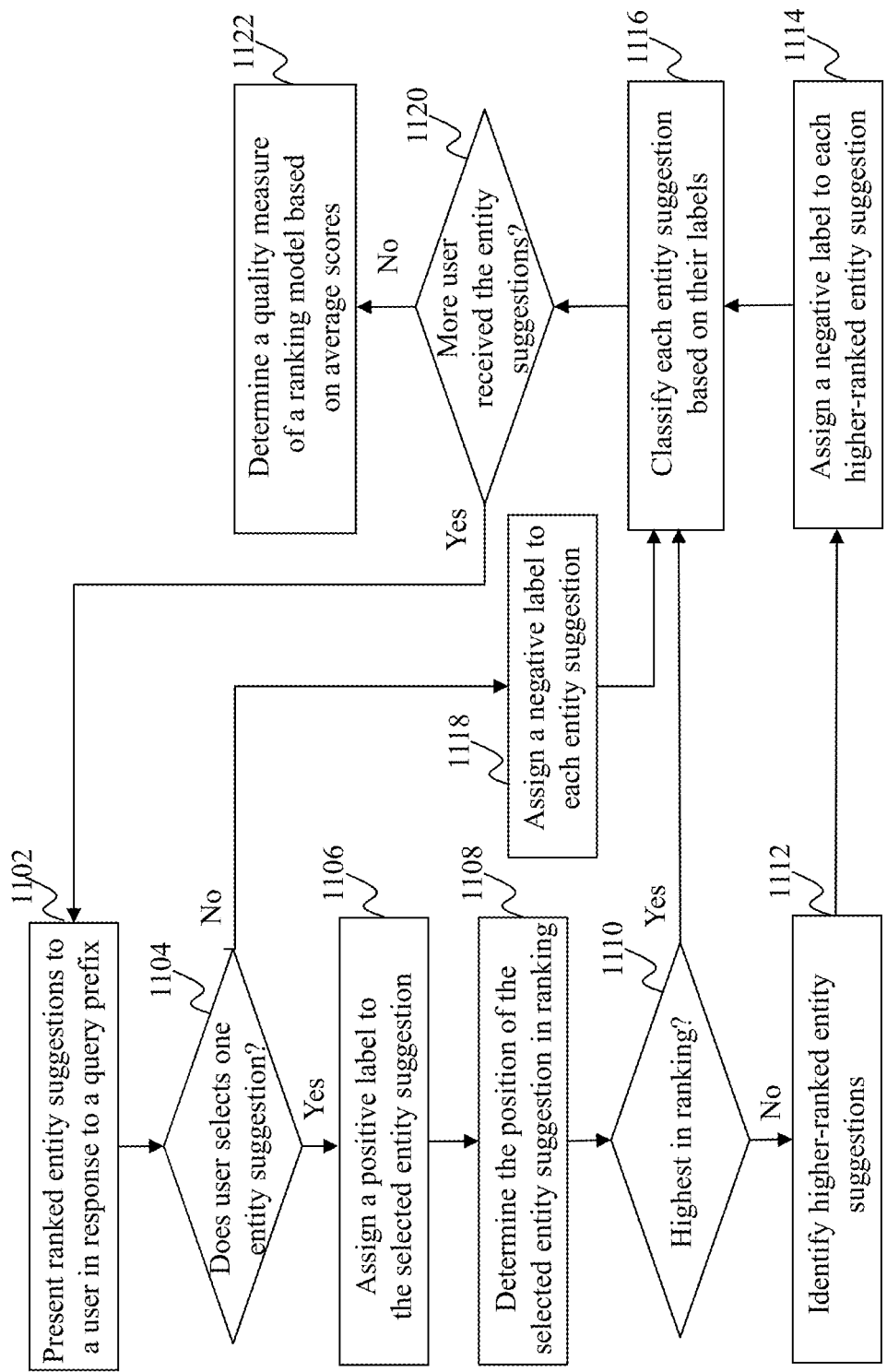
FIG. 11 is a flowchart of another exemplary process for evaluating query suggestions precision, according to an embodiment of the present teaching.

FIG. 11 is a flowchart of another exemplary process for evaluating query suggestions precision, according to an embodiment of the present teaching. Beginning at 1102, ranked entity suggestions are presented to a user in response to the user's input including a query prefix. At 1104, whether the user selects at least one entity suggestion is determined. If it is determined that the user selects an entity suggestion, at 1106, a positive label is assigned to the selected entity suggestion. At 1108, the position of the selected entity suggestion is determined. Whether the selected entity is the highest in the ranking is determined at 1110. If the answer at 1110 is no, higher-ranked entity suggestions are identified at 1112. These higher-ranked entity suggestions are deemed as being skipped. At 1114, a negative label is assigned to each of the skipped entity suggestions. At 1116, each entity suggestion is classified as, for example, "correct," "incorrect," or "unconsidered" based on their labels. Back to 1104, if none of the entity suggestions is selected by the user, then a negative label is assigned to each entity suggestion at 1118. In this case, all the entity suggestions are classified as "incorrect" at 1116. Back to 1110, if the selected entity suggestion is the highest in the ranking, then none of the entity suggestions is classified as "incorrect" because none of them is given a negative label. Nevertheless, it is determined at 1120 whether there are additional users who have received the entity suggestions. If the answer is yes, the process is repeated from 1102 for the next user. Until all the users in the evaluation user group have been considered, the process proceeds to 1122, where a quality measure of a ranking model used for ranking the entity suggestions is determined based on average scores. For example, the average scores may be MRR or average number of skipped entity suggestions in the user group.

Figure 12:
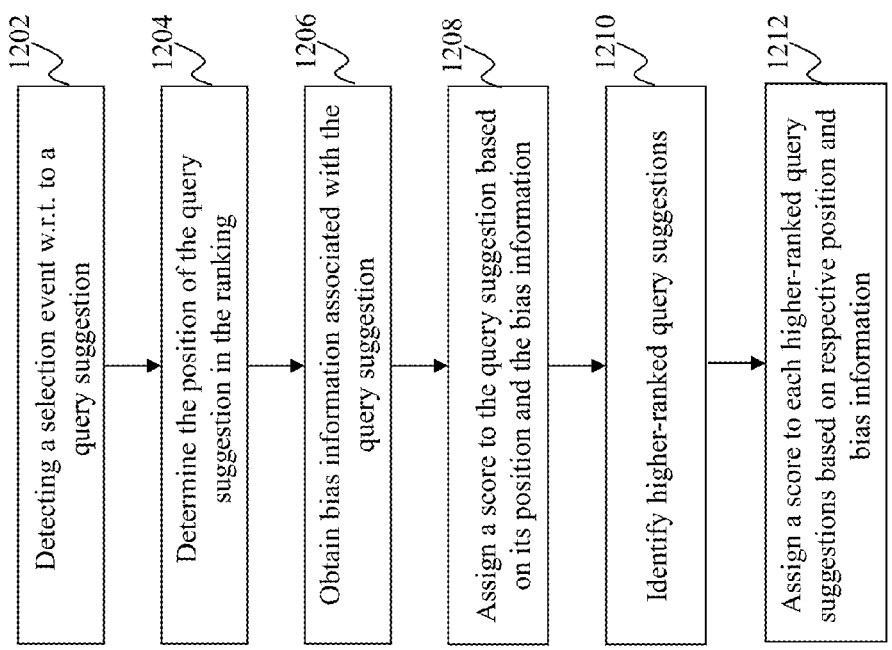
FIG. 12 is a flowchart of still another exemplary process for evaluating query suggestions precision, according to an embodiment of the present teaching.

FIG. 12 is a flowchart of still another exemplary process for evaluating query suggestions precision, according to an embodiment of the present teaching. Beginning at 1202, a selection event with respect to a query suggestion is detected. The user may select one or more query suggestions by mouse clicking, finger clicking on touch screen of a mobile device, hovering over, voice command, body gestures, or any other suitable user activities as known in the art. At 1204, the position of the selected query suggestion in the ranking is determined. At 1206, bias information associated with the selected query suggestion is obtained. For example, the different presentation styles of the query suggestions, the categories in which each entity suggestion belongs to, or the current query prefix length may have an impact on the user's selection or skipping of certain query suggestions. At 1208, a score is assigned to the selected query suggestion based on its position and bias information. For example, a standard positive score may be given to the selected query suggestion and then adjusted based on its bias information. At 1210, query suggestions ranked higher than the selected query suggestion are identified. At 1212, each higher-ranked query suggestion is given with another score based on respective position and bias information. For example, a standard negative score may be given to each skipped query suggestion and then adjusted based on their bias information. The adjusted scores for each query suggestion may be used for quality measure of the query suggestions.

Figure 14:
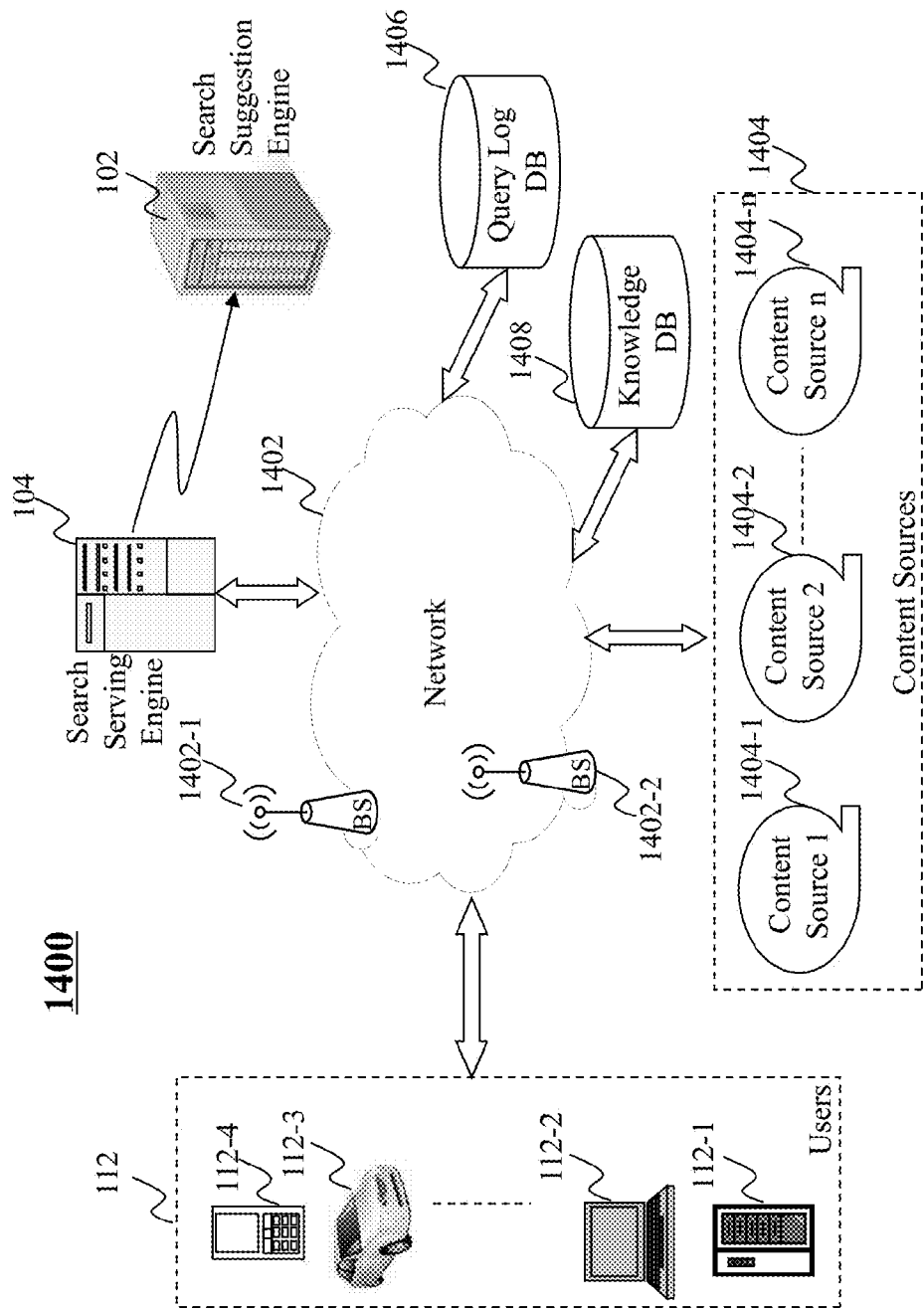
FIG. 14 depicts an exemplary embodiment of a networked environment in which the present teaching is applied, according to an embodiment of the present teaching.

FIG. 14 depicts an exemplary embodiment of a networked environment in which the present teaching is applied, according to an embodiment of the present teaching. In FIG. 14, the exemplary networked environment 1400 includes the search suggestion engine 102, the search serving engine 104, one or more users 112, a network 1402, content sources 1404, a query log database 1406, and a knowledge database 1408. The network 1402 may be a single network or a combination of different networks. For example, the network 1402 may be a local area network (LAN), a wide area network (WAN), a public network, a private network, a proprietary network, a Public Telephone Switched Network (PSTN), the Internet, a wireless network, a virtual network, or any combination thereof. The network 1402 may also include various network access points, e.g., wired or wireless access points such as base stations or Internet exchange points 1402-1, . . . , 1402-2, through which a data source may connect to the network 1402 in order to transmit information via the network 1402.

Users 112 may be of different types such as users connected to the network 1402 via desktop computers 112-1, laptop computers 112-2, a built-in device in a motor vehicle 112-3, or a mobile device 112-4. A user 112 may send a query or query prefix (partial query) to the search serving engine 104 via the network 1402 and receive query suggestions and search results from the search serving engine 104. In this embodiment, the search suggestion engine 102 serves as a backend system for providing query suggestions including entities to the search serving engine 104. The search serving engine 104 and search suggestion engine 102 may access information stored in the query log database 1406 and knowledge database 1408 via the network 1402. The information in the query log database 1406 and knowledge database 1408 may be generated by one or more different applications (not shown), which may be running on the search serving engine 104, at the backend of the search serving engine 104, or as a completely standalone system capable of connecting to the network 1402, accessing information from different sources, analyzing the information, generating structured information, and storing such generated information in the query log database 1406 and knowledge database 1408.

The content sources 1404 include multiple content sources 1404-1, 1404-2, . . . , 1404-*n*, such as vertical content sources (domains). A content source 1404 may correspond to a website hosted by an entity, whether an individual, a business, or an organization such as USPTO.gov, a content provider such as cnn.com and Yahoo.com, a social network website such as Facebook.com, or a content feed source such as tweeter or blogs. The search serving engine 104 may access information from any of the content sources 1404-1, 1404-2, . . . , 1404-*n*. For example, the search serving engine 104 may fetch content, e.g., websites, through its web crawler to build a search index.

Figure 15:
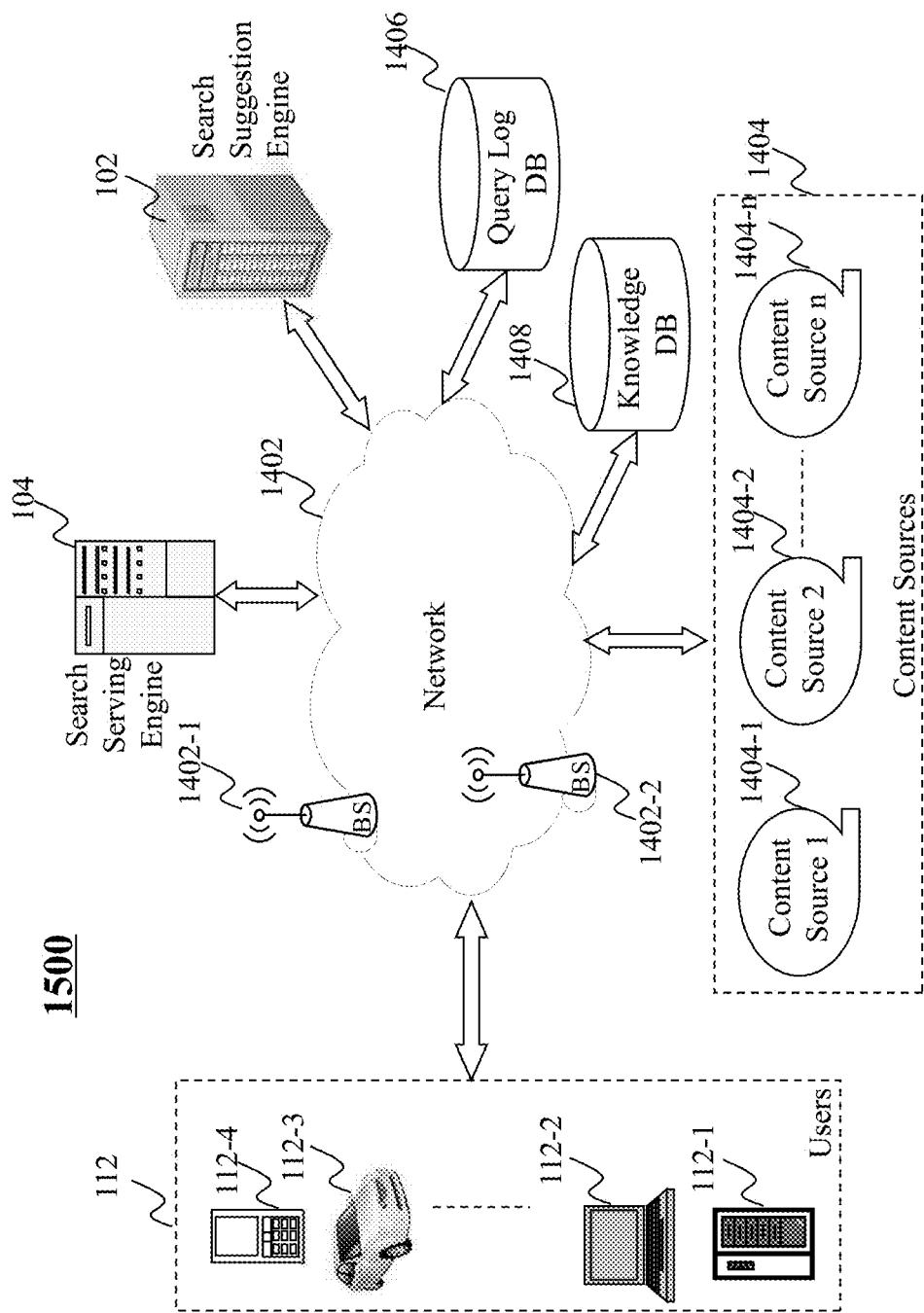
FIG. 15 depicts an exemplary embodiment of another networked environment in which the present teaching is applied, according to an embodiment of the present teaching.

FIG. 15 is a high level depiction of another exemplary networked environment 1500 in which query suggestion including entities is applied, according to an embodiment of the present teaching. The networked environment 1500 in this embodiment is similar to the networked environment 1400 in FIG. 14, except that the search suggestion engine 102 in this embodiment directly connects to the network 1402. For example, an independent service provider with the search suggestion engine 102 may serve multiple search engines via the network 1402.

Figure 16:
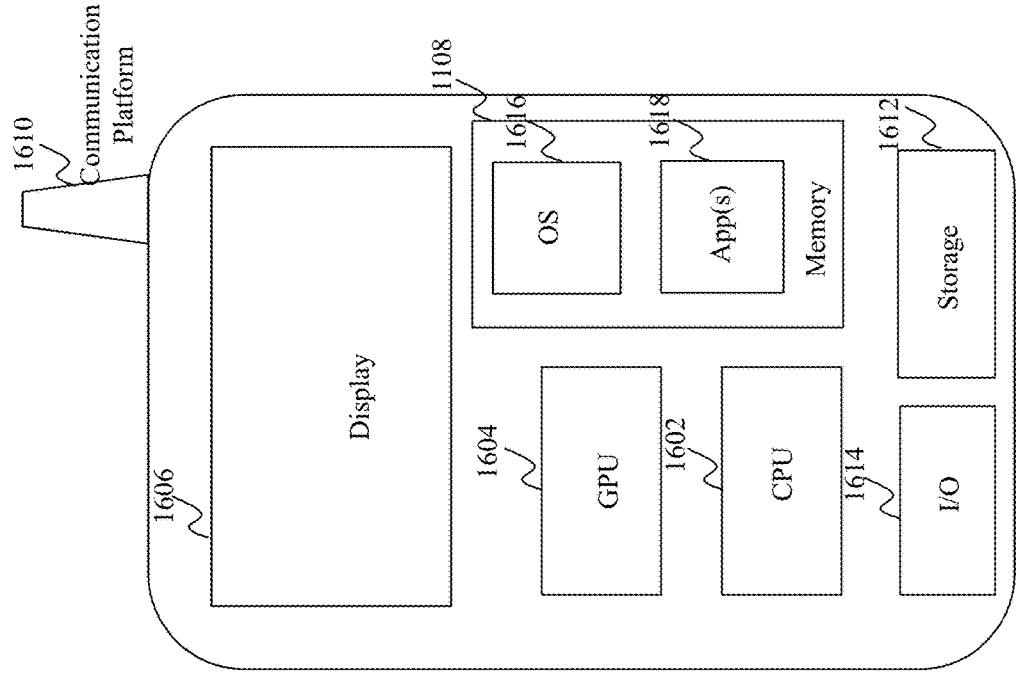
FIG. 16 depicts a general mobile device architecture on which the present teaching can be implemented.

FIG. 16 depicts a general mobile device architecture on which the present teaching can be implemented. In this example, the user device 114 is a mobile device 1600, including but is not limited to, a smart phone, a tablet, a music player, a handled gaming console, a GPS receiver. The mobile device 1600 in this example includes one or more central processing units (CPUs) 1602, one or more graphic processing units (GPUs) 1604, a display 1606, a memory 1608, a communication platform 1610, such as a wireless communication module, storage 1612, and one or more input/output (I/O) devices 1614. Any other suitable component, such as but not limited to a system bus or a controller (not shown), may also be included in the mobile device 1600. As shown in FIG. 16, a mobile operating system 1616, e.g., iOS, Android, Windows Phone, etc., and one or more applications 1618 may be loaded into the memory 1608 from the storage 1612 in order to be executed by the CPU 1602. The applications 1618 may include a web browser or any other suitable mobile search apps. Execution of the applications 1618 may cause the mobile device 1600 to perform some processing as described before. For example, the display of search suggestions and results is made by the GPU 1604 in conjunction with the display 1606. User inputs of search queries are received via the I/O devices 1614 and sent to the search serving engine 104 via the communication platform 1610.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 17:
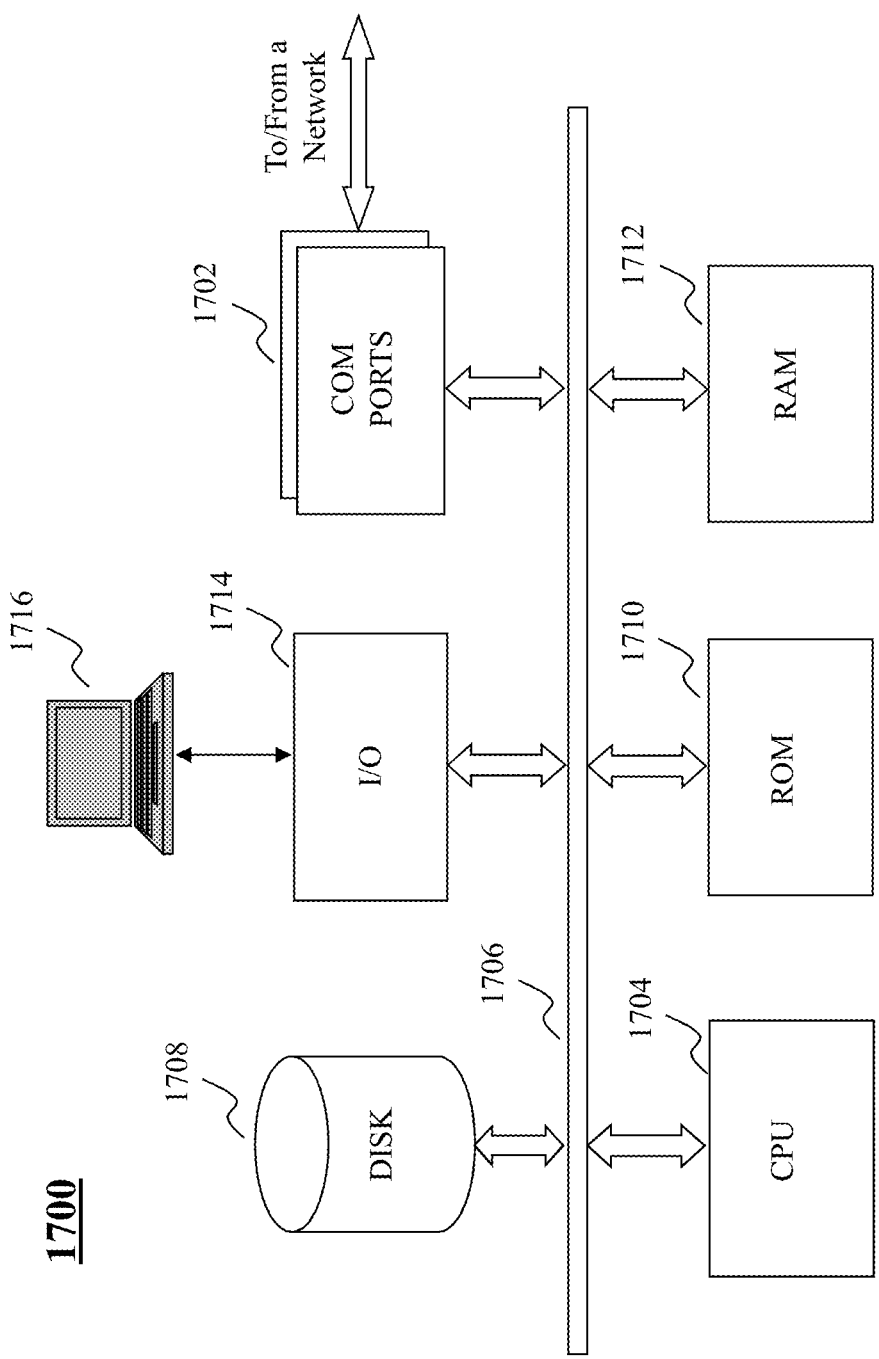
FIG. 17 depicts a general computer architecture on which the present teaching can be implemented.

FIG. 17 depicts a general computer architecture on which the present teaching can be implemented and has a functional block diagram illustration of a computer hardware platform that includes user interface elements. The computer may be a general-purpose computer or a special purpose computer. This computer 1700 can be used to implement any components of the query suggestion architecture as described herein. Different components of the system, e.g., as depicted in FIGS. 1 and 3, can all be implemented on one or more computers such as computer 1700, via its hardware, software program, firmware, or a combination thereof. Although only one such computer is shown, for convenience, the computer functions relating to search suggestion may be implemented in a distributed fashion on a number of similar platforms, to distribute the processing load.

The computer 1700, for example, includes COM ports 1702 connected to and from a network connected thereto to facilitate data communications. The computer 1700 also includes a CPU 1704, in the form of one or more processors, for executing program instructions. The exemplary computer platform includes an internal communication bus 1706, program storage and data storage of different forms, e.g., disk 1708, read only memory (ROM) 1710, or random access memory (RAM) 1712, for various data files to be processed and/or communicated by the computer, as well as possibly program instructions to be executed by the CPU 1704. The computer 1700 also includes an I/O component 1714, supporting input/output flows between the computer and other components therein such as user interface elements 1716. The computer 1700 may also receive programming and data via network communications.

Hence, aspects of the method of query suggestion, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the units of the host and the client nodes as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on at least one computing device each of which has at least one processor, storage, and a communication platform connected to a network for providing query suggestions, the method comprising the steps of:
   receiving a prefix of a query from a user;
   identifying a plurality of query suggestions based on the prefix of the query, wherein each of a first group of the plurality of query suggestions includes an entity that corresponds to the prefix;
   computing an initial score for each of the plurality of query suggestions;
   adjusting the initial score of each of the first group of the plurality of query suggestions based on a first model to generate an updated score for the query suggestion, wherein the first model is a function of an adjustable parameter associated with the query suggestion, and wherein the adjustable parameter associated with the query suggestion is determined based on a category of the query suggestion and a length of the prefix;
   ranking the plurality of query suggestions based on the updated scores for the first group of the plurality of query suggestions;
   determining a quality measure, indicative of quality of the ranked plurality of query suggestions, based on interaction of the user with respect to the ranked plurality of query suggestions; and
   updating the first model based on the quality measure.

2. The method of claim 1, wherein the adjustable parameter associated with the query suggestion is further updated based on a second model in accordance with activities of the user with respect to the first group of the plurality of query suggestions.

3. The method of claim 2, wherein the activities of the user with respect to the first group of the plurality of query suggestions include a selection of a query suggestion from the first group of the plurality of query suggestions.

4. The method of claim 1, wherein, for each of the first group of the plurality of query suggestions, the initial score is calculated based on popularity of the respective entity in the query suggestion and based on relevance between the respective entity in the query suggestion and the user from whom the prefix of the query is received.

5. The method of claim 4, wherein
   the initial score, for each of the first group of the plurality of query suggestions, is calculated based on a profile of the user and a profile of the respective entity in the query suggestion, and
   the profile of the respective entity is generated based on a category of the entity.

6. The method of claim 1, wherein
   the plurality of query suggestions include a first entity from a first category, a second entity from a second category, and a non-entity keyword, and
   the first model includes a first adjustable parameter for the first entity, a second adjustable parameter for the second entity, and a third adjustable parameter for the non-entity keyword.

7. The method of claim 1, wherein the plurality of query suggestions includes one or more remaining query suggestions in a second group, and
   wherein the ranking of the plurality of query suggestions is further based on the initial scores of the remaining query suggestions.

8. A method, implemented on at least one computing device each of which has at least one processor, storage, and a communication platform connected to a network for providing query suggestions, the method comprising the steps of:
   receiving a prefix of a query from a user;
   identifying a plurality of query suggestions including a first group of the plurality of query suggestions and at least one non-entity keyword based on the prefix of the query, wherein each of the first group of the plurality of query suggestions include an entity;
   computing an initial score for each of the plurality of query suggestions;
   adjusting the initial score of each of the first group of the plurality of query suggestions based on a first model to generate an updated score for the query suggestion, wherein the first model is a function of an adjustable parameter associated with the query suggestion, and wherein the adjustable parameter associated with the query suggestion is determined based on a category of the query suggestion and a length of the prefix;
   ranking the plurality of query suggestions based on the updated scores for the first group of the plurality of query suggestions and the initial score for the at least one non-entity keyword;

providing the ranked plurality of query suggestions to the user, wherein the first group of
the plurality of query suggestions and the at least one non-entity keyword are presented in different manners
determining a quality measure, indicative of quality of the ranked plurality of query suggestions, based on interaction of the user with respect to the ranked plurality of query suggestions; and
adjusting the first model based on the quality measure.

9. The method of claim 8, wherein each of the first group of the plurality of query suggestions is presented with a label indicating a category in which the query suggestion belongs to.

10. A system having at least one processor, storage, and a communication platform for providing query suggestions, the system comprising:
a retrieving module configured to receive a prefix of a query from a user and identify a plurality of query suggestions based on the prefix of the query;
a ranking module configured to compute an initial score for each of the plurality of query suggestions and adjusting the initial score of each of a first group of the plurality of query suggestions based on a first model to generate an updated score for the query suggestion and rank the plurality of query suggestions based on the updated scores for the first group of the plurality of query suggestions,
wherein each of a first group of the plurality of query suggestions includes an entity that corresponds to the prefix, the first model is a function of an adjustable parameter associated with the query suggestion, and the adjustable parameter associated with the query suggestion is determined based on a category of the query suggestion and a length of the prefix; and
a query suggestion evaluating module determining a quality measure, indicative of quality of the ranked plurality of query suggestions, based on interaction of the user with respect to the ranked plurality of query suggestions, for updating the first model based on the quality measure.

11. The system of claim 10, wherein the adjustable parameter associated with the query suggestion is further updated based on a second model in accordance with activities of the user with respect to the first group of the plurality of query suggestions.

12. The system of claim 11, wherein the activities of the user with respect to the first group of the plurality of query suggestions include a selection of a query suggestion from the first group of the plurality of query suggestions.

13. The system of claim 10, wherein, for each of the first group of the plurality of query suggestions, the initial score is calculated based on popularity of the respective entity in the query suggestion and based on relevance between the respective entity in the query suggestion and the user from whom the prefix of the query is received.

14. The system of claim 13, wherein
the initial score, for each of the first group of the plurality of query suggestions, is calculated based on a profile of the user and a profile of the respective entity in the query suggestion, and
the profile of the respective entity is generated based on a category of the entity.

15. The system of claim 10, wherein
the plurality of query suggestions include a first entity from a first category, a second entity from a second category, and a non-entity keyword, and
the first model includes a first adjustable parameter for the first entity, a second adjustable parameter for the second entity, and a third adjustable parameter for the non-entity keyword.

16. A non-transitory machine-readable medium having information recorded thereon for providing query suggestions, wherein the information, when read by the machine, causes the machine to perform the following:
receiving a prefix of a query from a user;
identifying a plurality of query suggestions based on the prefix of the query, wherein each of a first group of the plurality of query suggestions includes an entity that corresponds to the prefix;
computing an initial score for each of the plurality of query suggestions;
adjusting the initial score of each of the first group of the plurality of query suggestions based on a first model to generate an updated score for the query suggestion, wherein the first model is a function of an adjustable parameter associated with the query suggestion, and wherein the adjustable parameter associated with the query suggestion is determined based on a category of the query suggestion and a length of the prefix;
ranking the plurality of query suggestions based on the updated scores for the first group of the plurality of query suggestions;
determining a quality measure, indicative of quality of the ranked plurality of query suggestions, based on interaction of the user with respect to the ranked plurality of query suggestions; and
updating the first model based on the quality measure.

17. The medium of claim 16, wherein the adjustable parameter associated with the query suggestion is further updated based on a second model in accordance with activities of the user with respect to the first group of the plurality of query suggestions.

18. The medium of claim 17, wherein the activities of the user with respect to the first group of the plurality of query suggestions include a selection of a query suggestion from the first group of the plurality of query suggestions.

19. The medium of claim 16, wherein, for each of the first group of the plurality of query suggestions, the initial score is calculated based on popularity of the respective entity in the query suggestion and based on relevance between the respective entity in the query suggestion and the user from whom the prefix of the query is received.

* * * * *